Patented Apr. 5, 1938

2,113,241

UNITED STATES PATENT OFFICE 2,113,241

CATALYTIC SYNTHESIS OF AMINES

Elton B. Punnett, Buffalo, N. Y., assignor to National Aniline & Chemical Company, Inc., New York, N. Y., a corporation of New York No Drawing. Application December 29, 1931, Serial No. 583,710

26 Claims. (Cl. 260—127)

My invention relates to vapor phase catalytic reactions and particularly to the synthesis of organic amines by the vapor phase catalytic interreaction of alcohols with ammonia or organic ammonia derivatives.

It is well known that certain catalysts serve to promote dehydration of alcohols at high temperatures. Catalysts of the dehydration type have also been used in carrying out catalytic reactions between alcohols and other compounds where the reaction involves essentially dehydration. Organic amines have been produced experimentally heretofore by processes in which dehydration catalysts are employed, but it has been found that the activity of the catalysts heretofore used becomes greatly reduced in use, probably because the said catalysts also cause the formation of carbonaceous matter which collects on the catalyst, reducing the active surface thereof. The carbonaceous matter formed in such processes may be cleaned from the catalyst by igniting it in an oxidizing atmosphere to regenerate the same for use. Due to the formation of the coatings of carbonaceous matter on the catalyst in carrying out the reaction, however, processes heretofore used for the production of amines by catalytic reactions in vapor phase cannot be operated continuously for long periods of time and therefore are unsatisfactory for the production of organic amines on a commercial scale. Furthermore, the catalysts heretofore used in producing organic amines from alcohols and ammonia are expensive and in many instances give but a small yield of the amine and cause decomposition of the alcohol used in carrying out the process.

I have discovered that vapor phase reactions between alcohol and ammonia or organic ammonia derivatives can be successfully carried out provided certain types of catalysts are employed as contact agents, and that processes using catalysts hereinafter described in the production of organic amines can be operated continuously without forming substantial amounts of carbonaceous matter as a coating on the catalyst and without substantial reduction in the activity of the catalyst after long periods of operation.

Among the objects of my invention are to provide an improved method of effecting reactions between alcohols and ammonia or organic ammonia derivatives, to provide a simple and economical process for producing organic amines by vapor phase catalytic reactions between alcohols and ammonia or organic ammonia derivatives, to reduce the formation of carbonaceous matter as a coating on the catalyst in the production of organic amines, and to increase the life of the catalysts employed in carrying out the process. These and other objects and features of my invention will appear from the following description of my invention in which reference is made to specific examples illustrative of a preferred method of procedure in accordance therewith.

I have found that certain aluminum compounds of phosphoric and silicic acids, more particularly aluminum phosphates and silicates, have the ability to a marked degree of catalyzing the reaction between alcohols and ammonia or organic ammonia derivatives to produce the organic amines. I have also found that these materials retain their activity as catalysts without substantial deterioration during long periods of operation. Furthermore the yield of the amine produced is superior to that heretofore obtained and there is less decomposition of unreacted alcohol in carrying out the process.

The aluminum phosphates and silicates employed as catalysts in accordance with the present invention, are those combinations of aluminum with oxygen and silicon (aluminum silicates) or with oxygen and phosphorus (aluminum phosphates) which have a definite chemical composition and are of the nature of salts of the oxyacids of silicon and of phosphorus. They include the true salts, such as, aluminum phosphate ($AlPO_4$) and the minerals, such as Kaolinite ($Al_2O_3.SiO_2.2H_2O$). Water of hydration may be absent or present in the initial catalyst; it is generally partially or wholly driven off from the catalyst when the latter is heated to the catalytic reaction temperature. Accordingly, in the specification and claims the expression "salt-like combinations of aluminum with an oxy-acid of an element selected from the group consisting of silicon and phosphorus" denotes the said aluminum silicates and phosphates, both hydrated and anhydrous, and both true salts and minerals.

Among the said salt-like combinations which may be employed as catalysts in accordance with the present invention, there are included the various natural and synthetic acid, basic, and neutral ortho-, meta- and pyro-phosphates of aluminum and the various natural and synthetic aluminum silicates and polysilicates; as for example, Variscite, Callait, Zepharovichit, Gibsite, Kaolinite, Pyrophyllite, etc. The natural phosphates and silicates and particularly the phosphates of the Gibsinite group, and the hydrated aluminum silicates and clays, especially of the Kaolinite group, are preferably employed. The catalysts may be employed in conjunction with carriers, as for example, "grained" aluminum, "Alundum", and the like; but ordinarily a carrier is not essential.

The effectiveness of the foregoing catalysts in bringing about the reaction between alcohols and ammonia or organic ammonia derivatives varies somewhat and, among other factors, is dependent to some extent upon the nature of the alcohol and the ammonia derivative employed in the process, as well as upon the temperature at which the reaction is carried out. The action of the catalyst is also dependent upon the ratio of the reacting constituents of the mixture of alcohol and ammonia or organic ammonia derivatives in the mixture of materials treated.

I have found in practice that the use of the above-mentioned catalysts in the production of amines, such for instance as methylamine from methanol and ammonia, in vapor phase reactions at temperatures ranging from about 325° to 475° C., results in the production of methylamine without the formation of substantial amounts, if any, of carbonaceous material on the catalyst, such as has heretofore been produced in carrying out reactions of this type. I have also found that the catalyst retains its activity, giving substantially the same yield of amines for long periods of time. Furthermore, in view of the comparative cheapness of the natural phosphates and silicates of aluminum, and particularly of kaolin and similar clays, and, because of their sustained activity during the reaction, the process is inexpensive to carry out and may be operated continuously over a relatively long period of time without regenerating the catalyst. These advantages of the catalysts employed in practicing the process of my invention constitute a marked improvement over processes heretofore suggested for the production of amines by reactions in the vapor phase between alcohols and ammonia, and render my process particularly adapted for use in continuous operation on a commercial scale.

The invention will be illustrated by the following specific examples, but it will be evident to one skilled in the art that the invention is not limited thereto and that changes may be made in the materials treated, proportions of ingredients, method of procedure, reaction conditions, and other details without departing from the scope of the appended patent claims.

*Example I.*—A catalyst consisting of pellets of kaolin (Kaolinite) about ⅛ inch in diameter is prepared by molding and drying a water paste of kaolin at about 110° C. The catalyst pellets are packed in one end of a converter tube of pyrex glass, which is about 30 inches in length and about ¾ inch in diameter, for a depth of 9 inches, the catalyst and tube are heated to a temperature of about 450° to 470° C., more particularly about 460° C., throughout the length of the tube, and are then maintained at this temperature during the operation of the process. A mixture of 10 parts ammonia and 8 parts methanol (by weight) is then introduced into the unfilled end of the tube, which acts as a preheater, and then into the catalyst filling of the tube at a rate to produce a time of contact of about 2.2 to 2.3 seconds between the catalyst and the mixture of vapors. The gases leaving the converter tube are absorbed in water to take up the methylamine produced. The gases which pass unabsorbed through the water are condensed by refrigeration and contain dimethyl ether. Practically no dimethylamine or trimethylamine is formed under the above reaction conditions. From the resulting water solution the methylamine can be separated in any suitable manner and the dimethyl ether may be recovered for use or may be recirculated over the catalyst with the gases introduced into the converter tube to obtain further amounts of methylamine.

The catalyst employed in this experiment gives no indication of reduced activity after a period of sixty-five hours of operation, and the yield of the product is substantially the same throughout the period of operation. A yield of about 43 per cent. methylamine based on the methanol charged and of approximately 56 per cent. based on the methanol consumed is obtained in the foregoing example. About 22 per cent. of the methanol is recovered unchanged from the process and may be reacted with further amounts of ammonia to produce additional methylamine.

The ratio of ammonia to methanol in the foregoing example may be expressed as 2.3 mols of ammonia to 1 mol. of methanol and ratios of 2 to 2.5 mols of ammonia to 1 mol. of methanol are preferably used. If substantially smaller ratios of ammonia to methanol are used the di- and trimethyl amines are produced in increasing amount. Mixtures containing more than 2.5 mols of ammonia per mol. of methanol may be used, but they offer no advantage in the production of primary methylamine.

*Example II.*—A catalyst consisting of pellets of aluminum phosphate ($AlPO_4$) about ⅛ inch in diameter, is prepared and charged to a converter tube in the manner described in Example I. The catalyst and tube are heated to a temperature of about 400° C., throughout the length of the tube, and are then maintained at this temperature during the operation of the process. A mixture of 100 parts of ammonia gas and 17 parts of methanol (by weight) is then passed, first through the unfilled end of the tube and then into the filled portion of the tube at a rate to produce a time of contact between the catalyst and the mixture of vapors of about 2.9 to 3.0 seconds. The gases leaving the converter tube are absorbed in water to recover the methylamine produced, and the unabsorbed gases are condensed by refrigeration. A yield of methylamine of about 54.8 per cent., based on the methanol charged, is obtained; and substantially no secondary or tertiary amine is formed. Very little methanol, from 0 to 1.6 per cent., is recovered.

The process of this example also may be varied within limits without substantially affecting the result. The ratio of ammonia to methanol may be varied, but it is to be noted that a substantial increase in the proportion of alcohol decreases the yield of amine. The time of contact between the catalyst and the mixture of vapors may vary from about 2.6 to 3.3 seconds, depending upon the temperature employed.

While I have described the process above as applied to the production of methylamine from methanol and ammonia, the reaction is not limited to the production of methylamine or to the use of methanol or ammonia as the reacting constituents. Thus the methanol referred to above may be replaced by ethanol, n-propanol, isopropanol, isoamyl alcohol, secondary butanol, benzyl alcohol, borneol, cyclohexanol, or other aliphatic or cyclic alcohols or mixtures thereof, referred to in the claims as alcohols, to produce amines other than methylamine. I may also replace the ammonia employed in the foregoing examples by the desired proportion of methylamine, dimethylamine, ethylamine, aniline, o-toluidine, m-toluidine, p-toluidine, or other organic amine having at least one unsubstituted hydrogen atom attached to the nitrogen atom, which compounds are referred to in the claims as compounds of the type having the formula $NHRR^1$, where R and $R^1$ are hydrogen atoms or organic radicals.

It will, of course, be understood that the preferred temperature employed in carrying out the reaction between the alcohols and ammonia or organic ammonia derivatives referred to above, will depend upon the particular reacting materials and upon the character of the amine which it is desired to produce. It may be pointed out that, in general, higher temperatures are required to produce the best yields of aromatic substituted amines than are required to produce aliphatic amines. It may be further pointed out that the invention is particularly applied to the preparation of primary amines from ammonia and alcohols, and particularly primary alcohols.

Since, in carrying out the above process, changes may be made in the ingredients, procedure and conditions employed without departing from the scope of the invention, it is intended that all matter contained in the above description shall be interpreted as illustrative and not in a limiting sense, except as limited by the claims.

I claim:

1. In the art of producing substituted amines by reacting one of the class consisting of ammonia and primary and secondary amines with an alcohol in the vapor phase in contact with a catalyst at an elevated temperature, the improvement which comprises contacting the reaction mixture with a salt-like combination of aluminum with an oxyacid of an element selected from the group consisting of silicon and phosphorus, as a catalyst.

2. In the art of producing substituted amines by reacting one of the class consisting of ammonia and primary and secondary amines with an alcohol in the vapor phase in contact with a catalyst at an elevated temperature, the improvement which comprises contacting the reaction mixture with a salt-like combination of aluminum with an oxyacid of an element selected from the group consisting of silicon and phosphorus, as a catalyst, at a temperature of 325° to 475° C.

3. In the art of producing substituted amines by reacting one of the class consisting of ammonia and primary and secondary amines with an alcohol in the vapor phase in contact with a catalyst at an elevated temperature, the improvement which comprises contacting the reaction mixture with a contact mass initially containing a hydrated aluminum silicate.

4. In the art of producing substituted amines by reacting one of the class consisting of ammonia and primary and secondary amines with an alcohol in the vapor phase in contact with a catalyst at an elevated temperature, the improvement which comprises contacting the reaction mixture with a clay of the Kaolinite group, as a catalyst, at a temperature of 325° to 475° C.

5. In the art of producing substituted amines by reacting one of the class consisting of ammonia and primary and secondary amines with an alcohol in the vapor phase in contact with a catalyst at an elevated temperature, the improvement which comprises contacting the reaction mixture with a salt-like combination of aluminum with an oxyacid of phosphorus, as a catalyst.

6. In the art of producing substituted amines by reacting one of the class consisting of ammonia and primary and secondary amines with an alcohol in the vapor phase in contact with a catalyst at an elevated temperature, the improvement which comprises contacting the reaction mixture with an aluminum phosphate, as a catalyst, at a temperature of 325° to 475° C.

7. In the art of producing substituted amines by reacting one of the class consisting of ammonia and primary and secondary amines with an alcohol in the vapor phase in contact with a catalyst at an elevated temperature, the improvement which comprises contacting the reaction mixture with a natural aluminum phosphate of the Gibsinite group, as a catalyst, at a temperature of 325° to 475° C.

8. In the production of a primary organic amine by the interaction of ammonia with an alcohol in the vapor phase in contact with a catalyst at an elevated temperature, the improvement which comprises contacting the reaction mixture with a salt-like combination of aluminum with an oxyacid of an element selected from the group consisting of silicon and phosphorus, as a catalyst.

9. In the production of a primary organic amine by the interaction of ammonia with an alcohol in the vapor phase in contact with a catalyst at an elevated temperature, the improvement which comprises contacting the reaction mixture with a contact mass initially containing a hydrated aluminum silicate, at a temperature of 325° to 475° C.

10. In the production of a primary organic amine by the interaction of ammonia with a primary alcohol in the vapor phase in contact with a catalyst at an elevated temperature, the improvement which comprises contacting the reaction mixture with kaolin maintained at a temperature of about 450° to about 470° C.

11. In the production of methylamine by the interaction of ammonia with methanol in the vapor phase in contact with a catalyst at an elevated temperature, the improvement which comprises forming a mixture containing ammonia and methanol in the proportion of 2 to 2.5 mols of ammonia per mol. of methanol, and passing said mixture in contact with kaolin, as a catalyst.

12. In the production of methylamine by the interaction of ammonia with methanol in the vapor phase in contact with a catalyst, the improvement which comprises contacting the reaction mixture with a clay of the Kaolinite group, as a catalyst, at a temperature of 325° to 475° C.

13. In the production of methylamine by the interaction of ammonia with methanol in the vapor phase in contact with a catalyst, the improvement which comprises contacting a reaction mixture containing ammonia and methanol in the proportion of about 2 to 2.5 mols of ammonia per mol. of methanol with kaolin, as a catalyst, maintained at a temperature of about 450° to about 470° C.

14. In the production of methylamine by the interaction of ammonia with methanol in the vapor phase in contact with a catalyst at an elevated temperature, the improvement which comprises forming a mixture containing ammonia and methanol in a proportion not substantially less than 11 mols of ammonia per mol. of methanol, and passing said mixture in contact with aluminum phosphate, as a catalyst.

15. In the production of methylamine by the interaction of ammonia with methanol in the vapor phase in contact with a catalyst, the improvement which comprises contacting the reaction mixture with a natural aluminum phosphate of the Gibsinite group, as a catalyst, maintained at a temperature of about 400° C.

16. In the production of methylamine by the interaction of ammonia with methanol in the vapor phase in contact with a catalyst, the improvement which comprises contacting a reaction mixture containing ammonia and methanol in a proportion not substantially less than 11 mols of ammonia per mol. of methanol with aluminum phosphate, as a catalyst, maintained at a temperature of about 400° C.

17. In the art of producing amines by reacting an alcohol with one of the class consisting of ammonia and primary and secondary amines the improvement which consists in carrying out such reaction in the presence of a catalyst containing phosphorus.

18. In the art of producing amines by reacting an alcohol with one of the class consisting of ammonia and primary and secondary amines the improvement which consists in carrying out such reaction in the vapor phase in the presence of a heated catalyst containing phosphorus.

19. In the art of producing amines by reacting an alcohol with one of the class consisting of ammonia and primary and secondary amines the improvement which consists in carrying out such reaction in the presence of a catalyst containing an oxygen compound of phosphorus.

20. In the art of producing amines by reacting an alcohol with one of the class consisting of ammonia and primary and secondary amines the improvement which consists in carrying out such reaction in the presence of a catalyst containing a compound of phosphorus containing a phosphoric acid radical.

21. In the production of an alkylamine by the interaction of ammonia with an aliphatic alcohol in the vapor phase in contact with a catalyst at an elevated reaction temperature, the improvement which comprises contacting the reaction mixture at said elevated reaction temperature with aluminum silicate as a catalyst.

22. Process for the production of methyl amine which comprises passing a mixture of methanol and ammonia at temperatures ranging from 325° to 475° C. over catalysts comprising aluminum silicate, and recovering and separating the products thereby formed.

23. Process for the production of methyl amine which comprises passing a mixture of methanol and ammonia at approximately 400° C. over catalysts comprising aluminum silicate, and recovering and separating the products thereby formed.

24. In a process for the production of methyl amine, the steps which comprise passing a mixture of methanol and ammonia at temperatures ranging from 325° to 475° C. over catalysts comprising aluminum silicate.

25. In a process for the production of methyl amine, the steps which comprise passing a mixture of methanol and ammonia at temperatures ranging from 325° to 475° C. over catalysts comprising a clay.

26. In the production of an amine by the interaction of one of the class consisting of ammonia and primary and secondary amines with an alcohol in contact with a catalyst at an elevated reaction temperature, the improvement which comprises contacting the reaction mixture at said elevated reaction temperature with aluminum silicate as a catalyst.

ELTON B. PUNNETT.